United States Patent [19]

Justice et al.

[11] Patent Number: 5,593,359
[45] Date of Patent: Jan. 14, 1997

[54] MULTIPLE SPEED-RATIO TRANSAXLE ASSEMBLY FOR AUTOMOTIVE VEHICLES

[75] Inventors: Clinton F. Justice, Northville; Daniel W. McCarrick, Canton, both of Mich.

[73] Assignee: Ford Motor Company, Dearborn, Mich.

[21] Appl. No.: 517,396

[22] Filed: Aug. 21, 1995

[51] Int. Cl.⁶ ........................................ F16H 3/64
[52] U.S. Cl. ............................................. 475/280
[58] Field of Search .................. 475/200, 205, 475/206, 280, 281, 286, 287

[56] References Cited

U.S. PATENT DOCUMENTS 3,956,946   5/1976   Murakami et al. ............. 475/280
4,070,927   1/1978   Polak .
4,976,670   11/1990  Klemen .
5,013,289   5/1991   Van Maanen .
5,039,305   8/1991   Pierce .
5,106,352   4/1992   Lepelletier .
5,226,862   7/1993   Hattori .
5,230,671   7/1993   Michioka et al. .
5,267,913   12/1993  Beim et al. .
5,267,916   12/1993  Beim et al. .
5,435,792   7/1995   Justice et al. .

Primary Examiner—Dirk Wright
Attorney, Agent, or Firm—Frank G. McKenzie

[57] ABSTRACT

An automatic transmission for a motor vehicle includes two layshaft gearsets, three planetary gear units, friction clutches, friction brakes, and an overrunning coupling. The input shaft of the transmission is adapted to drive elements of the planetary gear units. An alternate arrangement replaces the layshaft gearsets with chain drive mechanisms.

17 Claims, 2 Drawing Sheets

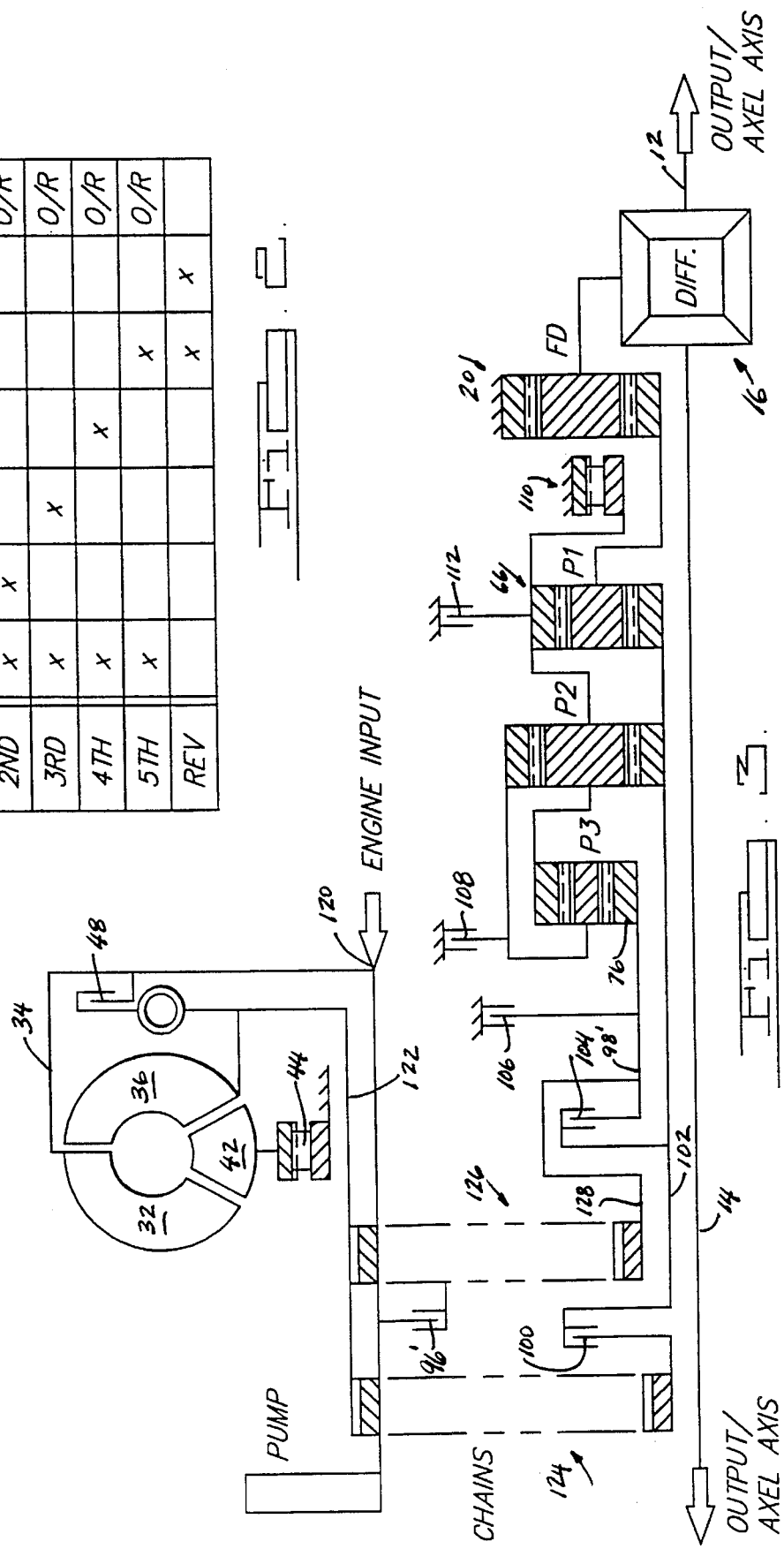

MULTIPLE SPEED-RATIO TRANSAXLE ASSEMBLY FOR AUTOMOTIVE VEHICLES

BACKGROUND OF THE INVENTION

1. Field of the Invention

This invention relates to multiple speed-ratio transmission mechanisms for use in automotive vehicles.

2. Description of the Prior Art

Four-speed automatic transmissions conventionally include multiple planetary gearsets; friction elements, such as hydraulically-actuated clutches and brakes; a torque converter; and damped torque converter lock-up clutch. These transmissions are employed in rear-wheel drive vehicles where the transmission shaft and engine crankshaft are parallel to the longitudinal axis of the vehicle, and in front-wheel drive vehicles where the transaxle and engine crank shaft are parallel to the transverse axis of the vehicle.

A current trend in the automobile industry is to provide five-speed and six-speed automatic transmissions, which conventionally require three planetary gear units and a large number of friction elements to control the gearing that are required in four-speed transmissions. Automatic transmissions having five or six forward speed ratios require greater size, particularly increased length, to accommodate additional planetary gear units and friction elements. Furthermore, automatic transmissions require nonsynchronous gear shifting, which conventionally requires greater use of one-way couplings and more space within the transmission casing, particularly increased length.

These trends toward features that enhance performance of automatic transmissions have produced a need for an extremely compact transmission suitable for use in a rear-wheel drive vehicle and adapted to fit within a space that is small in comparison to the space required for a conventional five-speed or six-speed transmission. U.S. Pat. Nos. 5,106,352 and 5,429,557 describe a multiple speed automatic transmission having gear units comprising constant mesh gear wheels, a double planetary gearset, and various control brakes.

SUMMARY OF THE INVENTION

A multiple speed automatic transmission according to the present invention includes a first shaft adapted for a drive connection to a power source; first and second input shafts; a first mechanism for alternately driveably connecting and releasing the first shaft and first input shaft; a second means for alternately driveably connecting and releasing the first shaft and second input shaft. First, second and third gear units, each have a sun gear, ring gear, planet pinions meshing with the sun gear and ring gear, and carrier rotatably supporting the planet pinions; the carrier of the second gear unit, ring gear of the first gear unit, and ring gear of the third gear unit being mutually driveably connected; the carrier of the third gear unit and ring gear of the second gear unit being mutually driveably connected; the sun gears of the first and second gear units and first input shaft being mutually driveably connected; and the sun gear of the third gear unit being driveably connected to the second input shaft. A brake means holds the ring gear of the first gear unit against rotation. A first brake releasably holds the sun gear of the third gear unit against rotation. A second brake releasably holds the ring gear of the second gear unit and carrier of the third gear unit against rotation.

The brake means includes a friction brake having one element fixed against rotation and a second element connected to the ring gear of the first gear unit; and an overrunning brake for producing a one-way drive connection of the ring gear of the first gear unit and a nonrotating member.

The first shaft is disposed substantially perpendicular to the longitudinal axis of a motor vehicle. A second shaft is disposed substantially parallel to the longitudinal axis of a motor vehicle and is adapted for connection to a power source.

A torque converter produces a hydrokinetic drive connection of the second shaft and a power source. A bevel gear set has a pinion connected to the second shaft, and a bevel gear meshing with the bevel pinion and driveably connected to the first shaft.

BRIEF DESCRIPTION OF THE DRAWINGS

FIG. 2 is a chart that shows engagement and release patterns for the clutches and brakes illustrated schematically in FIGS. 1 and 3.

FIG. 3 is a schematic diagram of a hydrokinetic arrangement of a multiple speed transaxle according to this invention suited for use in a front-wheel drive configuration.

DESCRIPTION OF THE PREFERRED EMBODIMENT

Figure 1:
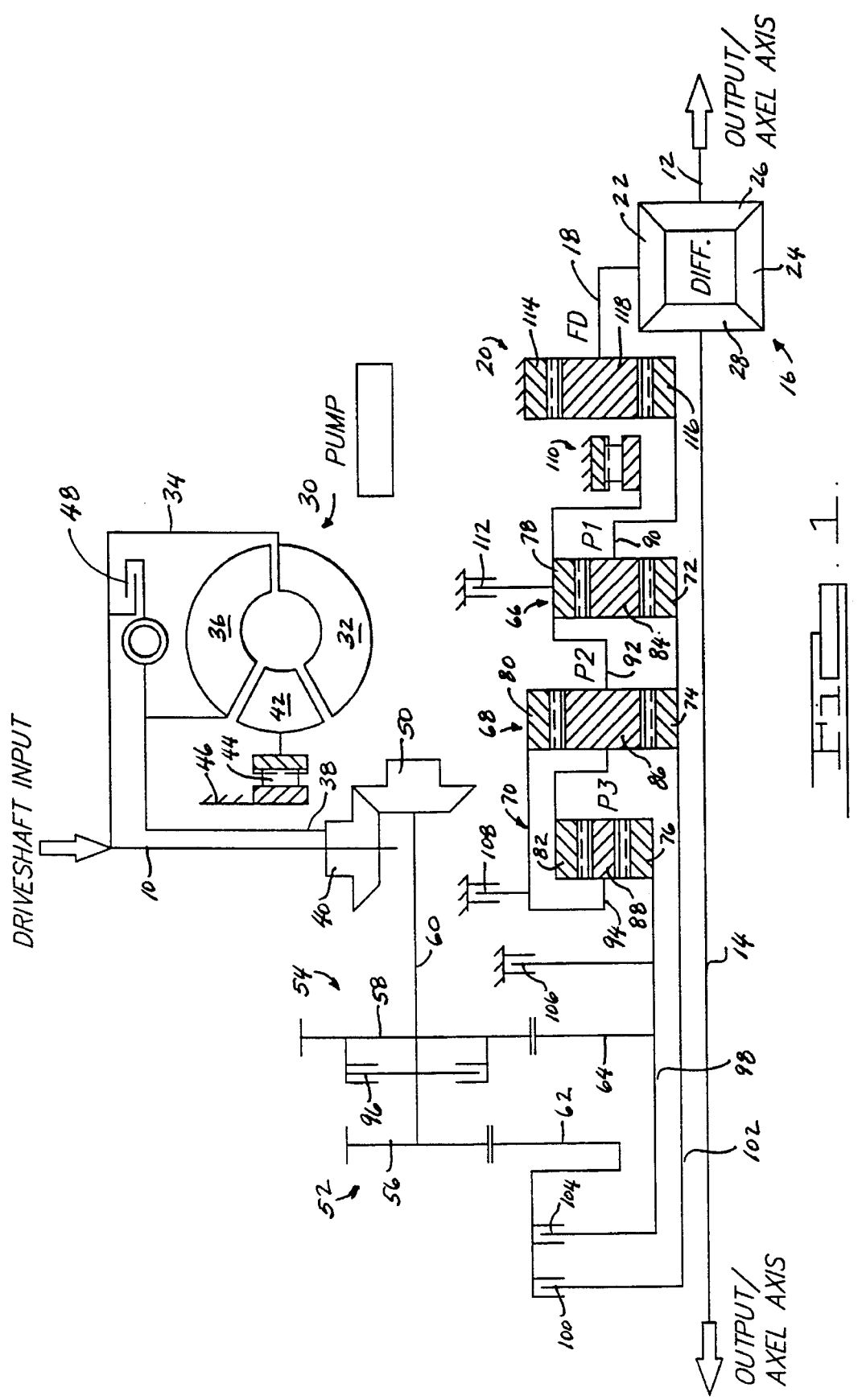
FIG. 1 is a schematic representation of a hydrokinetic arrangement of a multiple speed transmission according to this invention.

Referring first to FIG. 1, the transaxle is driveably connected to a drive shaft 10, whose axis is substantially parallel to the longitudinal axis of a motor vehicle. The right-hand axle shaft 12 and left-hand axle shaft 14 extend laterally from a differential mechanism 16, which is driveably connected to the carrier 18 of a final drive gearset 20. Carrier 18 drives bevel pinions 22, 24, which are in continuous meshing engagement with side bevel gears 26, 28, driveably connected to the corresponding axle shaft 12, 14.

A hydrokinetic torque converter 30, whose axis is aligned with that of drive shaft 10, includes a bladed impeller wheel 32, driveably connected by impeller casing 34 to drive shaft 10; a bladed turbine wheel 36, driveably connected by a sleeve shaft 38 to a bevel pinion 40; and a bladed stator wheel 42, connected by a one-way coupling 44 to a transmission casing 46. A bypass clutch 48 alternately connects and disconnects drive shaft 10 and sleeve shaft 38. When clutch 48 is disengaged, turbine wheel 36 is driven hydrodynamically from impeller 32. When clutch 48 is engaged, drive shaft is directly connected to sleeve shaft 38.

Power carried by shaft 38 is directed laterally by the bevel pinion 40 and bevel gear 50 to two layshaft gearsets 52, 54. Pinion 56 is fixed to shaft 60, but pinion 58 is connected and released alternately by clutch 96 to shaft 60. Gears 62, 64 are in continuous meshing engagement with their corresponding pinions 56, 58, respectively. Gears 62 and 64 rotate at substantially the same speed; one of these gears may have one more tooth than the other.

The transaxle includes three planetary gear units 66, 68, 70, each including a sun gear 72, 74, 76, a ring gear 78, 80, 82, a set of planet pinions 84, 86, 88, and a planet carrier 90, 92, 94, which rotatably supports the pinions in continuous meshing engagement with the respective sun gear and ring gear.

Connections among the components of the gear units and shaft 60 are controlled by hydraulically actuated clutches. Various hydraulically actuated brakes hold components of the gearset and shafts against rotation.

Clutch 96 alternately driveably connects shaft 60 and pinion 58, thereby driving gear 64, sun gear 76, and sleeve shaft 98.

Clutch 100 alternately driveably connects and releases shaft 60 and gear 62, which drives through gearset 52 from shaft 60. Clutch 100 is connected through a sleeve shaft 102 to sun gears 72, 74.

Clutch 104 alternately driveably connects and releases sun gear 76 and gear 62.

Brake 106 alternately holds against rotation and releases for rotation sleeve shaft 98 and sun gear 76. Carrier 94 and sun gear 80 are alternately held against rotation on the transmission housing and released by engagement and disengagement, respectively, of brake 108. Carrier 92, ring gear 82, ring gear 78, and the inner race of one-way brake 110 are held against rotation on the transmission housing when brake 112 is engaged and are released for rotation when clutch 112 is released.

The final drive gear unit 20 includes ring gear 114, which is permanently fixed to the transmission housing; sun gear 116, which is permanently connected to carrier 90; and a set of planet pinions 118, which are in continuous meshing engagement with sun gear 116 and ring gear 114.

The schedule of clutch and brake engagement and disengagement shown in FIG. 2 will be used next to describe operation of the gearing in five forward speed ratios and reverse drive. The first forward speed ratio is produced when direct clutch 100 is engaged and the other clutches and brakes are disengaged. During conditions when power is transmitted from shaft 60 to the axle shafts 12, 14, overrunning brake 110 produces a drive connection between the transmission housing and its inner race. Sun gears 74 and 72 are driven from shaft 60 through operation of the first layshaft gearset 52 and engagement of clutch 100. Ring gear 78 is held fixed against rotation due to the drive connection through brake 110. The output is taken at carrier 90 through the final drive gear unit 20, which drives bevel pinions 22 and 24 of differential gear mechanism 16. The axle shafts 12 and 14 are driven through operation of the differential mechanism by side-bevel gears 26, 28.

During coast conditions when power is transmitted from the axle shafts to shaft 60, coast brake 112 is engaged because coupling 110 overruns. The torque reaction is provided at ring gear 78 on the transmission casing.

An upshift to the second forward speed ratio occurs by maintaining clutch 100 engaged, as it is during operation in each forward speed ratio, and by engaging brake 108 also. When this occurs, coupling 110 overruns, and sun gears 72, 74 are driven from shaft 60 through the layshaft gearset 52 and clutch 100. A torque reaction is provided at ring gear 80, which is held against rotation due to engagement of brake 108. Carrier 92 drives ring gear 78, and the output is taken on carrier 90 through the final drive gear unit 20 to the differential mechanism 60.

An upshift to the third forward speed ratio results by disengaging brake 108 and engaging brake 106. Again, sun gears 72, 74 are driven from shaft 60 through gearset 52 and clutch 100. A torque reaction is provided by holding sun gear 76 fixed against rotation through engagement of brake 106. Carrier 92, ring gear 82, and ring gear 78 rotate at the same speed. Carrier 94 of the third gear unit 70 and ring gear 80 of the second gear unit 68 rotate at the same speed. Sun gears 72, 74 rotate at the same speed. The output is taken at carrier 90 of the first gear unit 66.

An upshift from the third speed ratio to the fourth speed ratio results by disengaging brake 106 and engaging clutch 104 instead. In this instance, all of the sun gears 72, 74, 76 are driven by shaft 60 through gearsets 52, 54 and clutches 100 and 104. If sun gears rotate at the same speed, two elements of each of the gear units is driven at the same speed; therefore, the output, carrier 90, driven at the same speed as that of the sun gears, and the fourth speed ratio is a direct drive ratio. If sun gears 72, 74 rotate at a different speed than that of sun gear 76, then the fourth gear is slightly different from direct drive.

An upshift to the fifth speed ratio results by disengaging clutch 104 and engaging clutch 96 instead. Sun gear 76 is driven by shaft 60 through layshaft gearset 54 and clutch 96. Sun gears 72, 74, 76 are driven by shaft 60 through gearsets 52, 54 and clutches 100, 104. Ring gear 82, carrier 90, and ring gear 78 rotate at the same speed, carrier 94 and ring gear 80 turn at the same speed, and the output is taken at carrier 90.

In order to produce reverse drive, clutch 96 and brake 112 are engaged. Sun gear 76 is driven from shaft 60 through layshaft gearset 54 due to the engagement of clutch 96. Ring gear 82, carrier 92, and ring gear 78 are held fixed against rotation on the transmission casing due to engagement of brake 112, thereby providing a torque reaction. Therefore, the speed of carrier 94 and ring gear 80 are determined in relation to the speed of sun gear 76. The output of second gear unit 68 is taken at sun gear 74, which drives sun gear 72 at the same speed. Ring gear 78 is fixed against rotation; therefore, the output is taken at carrier 90.

Refer now to FIG. 3, which shows this invention applied to a front-wheel drive configuration. Here, an engine crankshaft 120 is driveably connected to impeller wheel 32, and a sleeve shaft 122 is driveably connected to the turbine wheel 36 to chain drive mechanisms 124, 126, which driveably connect input shaft 124 to sleeve shaft 122.

Preferably, shafts 124 and 98' are driven from shaft 60 at substantially the same speed, depending upon the relative diameters of the drive sprocket and driven sprocket associated with eech chain drive mechanism. For example, input shaft 124 includes sprocket wheels on sleeve shaft 122 and input shaft 124 and chain drive mechanism 126 include sprocket wheels on shafts 122 and 124.

In a way similar to that described with reference to FIG. 1, clutch 100 alternately driveably connects and releases input shaft 122 and the output 126 of chain drive 124. Clutch 104 alternately driveably connects and releases sun gear 76 of the third planetary gear unit 70 and the output 128 of chain drive mechanism 126. Clutch 96' connects shaft 122 and chain drive mechanism 126.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A multiple speed automatic transmission, comprising:

a first shaft adapted for a drive connection to a power source;

first and second input shafts;

first means for alternately driveably connecting and releasing the first shaft and first input shaft;

second means for alternately driveably connecting and releasing the first shaft and second input shaft;

first, second and third gear units, each having a sun gear, ring gear, planet pinions meshing with the sun gear and ring gear, and carrier rotatably supporting the planet pinions;

the carrier of the second gear unit, ring gear of the first gear unit, and ring gear of the third gear unit being mutually driveably connected;

the carrier of the third gear unit and ring gear of the second gear unit being mutually driveably connected;

the sun gears of the first and second gear units and first input shaft being mutually driveably connected;

the sun gear of the third gear unit driveably connected to the second input shaft;

brake means for holding the ring gear of the first gear unit against rotation, comprising a friction brake having one element fixed against rotation and a second element connected to the ring gear of the first gear unit and an overrunning brake for producing a one-way drive connection of the ring gear of the first gear unit and a nonrotating member.

2. The transmission of claim 1, wherein the first shaft is disposed substantially perpendicular to the longitudinal axis of a motor vehicle, further comprising:

a second shaft disposed substantially parallel to the longitudinal axis of a motor vehicle and adapted for connection to a power source;

a torque converter for producing a hydrokinetic drive connection of the second shaft and a power source; and a bevel gear set having a pinion connected to the second shaft, and a bevel gear meshing with the bevel pinion and driveably connected to the first shaft.

3. The transmission of claim 1 further comprising:

third means disposed in parallel with the second means between the first shaft and second input shaft for alternately driveably connecting the first shaft and second input shaft.

4. The transmission of claim 1 wherein the first means comprises:

a first mechanism for transmitting power having a first member connected to the first shaft and a second member driveably engaged with the first member;

a first friction clutch for releasably connecting the second member and the first input shaft; and a second friction clutch for releasably connecting the second member and the second input shaft.

5. The transmission of claim 3 wherein the third means comprises:

a second mechanism for transmitting power having a third member journalled on the first shaft, and a fourth member driveably engaged with the third member and driveably connected to the second input shaft;

a third friction clutch for releasably connecting the first shaft and the third member.

6. The transmission of claim 1 further comprising a first brake for releasably holding the sun gear of the third gear unit against rotation.

7. The transmission of claim 1 further comprising a second brake for releasably holding the ring gear of the second gear unit and carrier of the third gear unit against rotation.

8. A multiple speed automatic transmission, comprising:

a first shaft adapted for a drive connection to a power source;

first and second input shafts;

first means for alternately driveably connecting and releasing the first shaft and first input shaft;

second means for alternately driveably connecting and releasing the first shaft and second input shaft;

third means disposed in parallel with the second means between the first shaft and second input shaft for alternately driveably connecting the first shaft and second input shaft;

first, second and third gear units, each having a sun gear, ring gear, planet pinions meshing with the sun gear and ring gear, and carrier rotatably supporting the planet pinions;

the carrier of the second gear unit, ring gear of the first gear unit, and ring gear of the third gear unit being mutually driveably connected;

the carrier of the third gear unit and ring gear of the second gear unit being mutually driveably connected;

the sun gears of the first and second gear units and first input shaft being mutually driveably connected;

the sun gear of the third gear unit being driveably connected to the second input shaft;

brake means for holding the ring gear of the first gear unit against rotation;

a first brake for releasably holding the sun gear of the third gear unit against rotation; and a second brake for releasably holding the ring gear of the second gear unit and carrier of the third gear unit against rotation.

9. The transmission of claim 8 wherein the brake means comprises:

a friction brake having one element fixed against rotation and a second element connected to the ring gear of the first gear unit; and an overrunning brake for producing a one-way drive connection of the ring gear of the first gear unit and a non-rotating member.

10. The transmission of claim 8, wherein the first shaft is disposed substantially perpendicular to the longitudinal axis of a motor vehicle, further comprising:

a second shaft disposed substantially parallel to the longitudinal axis of a motor vehicle and adapted for connection to a power source;

a torque converter for producing a hydrokinetic drive connection of the second shaft and a power source; and a bevel gear set having a pinion connected to the second shaft, and a bevel gear meshing with the bevel pinion and driveably connected to the first shaft.

11. The transmission of claim 8 wherein the first means comprises:

a first mechanism for transmitting power having a first member connected to the first shaft and a second member driveably engaged with the first member; and a first friction clutch for releasably connecting the second member and the first input shaft.

12. The transmission of claim 8 wherein the third means comprises:

a second mechanism for transmitting power having a third member journalled on the first shaft, and a fourth member driveably engaged with the third member and driveably connected to the second input shaft;

a third friction clutch for releasably connecting the first shaft and the third member.

13. A multiple speed automatic transmission, comprising:

a first shaft adapted for a drive connection to a power source;

first and second input shafts;

first means for alternately driveably connecting and releasing the first shaft and first input shaft;

second means for alternately driveably connecting and releasing the first shaft and second input shaft;

first, second and third gear units, each having a sun gear, ring gear, planet pinions meshing with the sun gear and ring gear, and carrier rotatably supporting the planet pinions;

the carrier of the second gear unit, ring gear of the first gear unit, and ring gear of the third gear unit being mutually driveably connected;

the carrier of the third gear unit and ring gear of the second gear unit being mutually driveably connected;

the sun gears of the first and second gear units and first input shaft being mutually driveably connected;

the sun gear of the third gear unit driveably connected to the second input shaft;

brake means for holding the ring gear of the first gear unit against rotation comprising a friction brake having one element fixed against rotation and a second element connected to the ring gear of the first gear unit and an overrunning brake for producing a one-way drive connection of the ring gear of the first gear unit and a nonrotating member;

a first brake for releasably holding the sun gear of the third gear unit against rotation; and a second brake for releasably holding the ring gear of the second gear unit and carrier of the third gear unit against rotation.

14. The transmission of claim 13, wherein the first shaft is disposed substantially perpendicular to the longitudinal axis of a motor vehicle, further comprising:

a second shaft disposed substantially parallel to the longitudinal axis of a motor vehicle and adapted for connection to a power source;

a torque converter for producing a hydrokinetic drive connection of the second shaft and a power source; and a bevel gear seat having a pinion connected to the second shaft, and a bevel gear meshing with the bevel pinion and driveably connected to the first shaft.

15. The transmission of claim 13 further comprising:

third means disposed in parallel with the second means between the first shaft and second input shaft for alternately driveably connecting the first shaft and second input shaft.

16. The transmission of claim 13 wherein the first means comprises:

a first mechanism for transmitting power having a first member connected to the first shaft and a second member driveably engaged with the first member;

a first friction clutch for releasably connecting the second member and the first input shaft; and a second friction clutch for releasably connecting the second member and the second input shaft.

17. The transmission of claim 13 wherein the third means comprises:

a second mechanism for transmitting power having a third member journalled on the first shaft, and a fourth member driveably engaged with the third member and driveably connected to the second input shaft;

a third friction clutch for releasably connecting the first shaft and the third member.

* * * * *